US009124175B2

(12) United States Patent
Mizuno et al.

(10) Patent No.: US 9,124,175 B2
(45) Date of Patent: Sep. 1, 2015

(54) LOAD DRIVE CONTROL DEVICE (71) Applicant: DENSO CORPORATION, Kariya, Aichi-pref. (JP)

(72) Inventors: Yuuta Mizuno, Anjo (JP); Fumihiko Nakane, Nishio (JP); Fuminori Suzuki, Okazaki (JP); Hiromitsu Nagata, Nagoya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/296,751

(22) Filed: Jun. 5, 2014

(65) Prior Publication Data
US 2014/0375290 A1   Dec. 25, 2014

(30) Foreign Application Priority Data
Jun. 20, 2013   (JP) ................................ 2013-129685

(51) Int. Cl.
*G05F 1/00* (2006.01)
*H02M 3/156* (2006.01)

(52) U.S. Cl.
CPC ..................................... *H02M 3/156* (2013.01)

(58) Field of Classification Search
CPC .......... H02M 3/156–3/158; H02M 2007/4815; H02M 2007/4818
USPC ......... 323/282–285, 234, 247–248, 265, 305, 323/301; 327/110, 423, 588; 331/65; 700/280
See application file for complete search history.

(56) References Cited

U.S. PATENT DOCUMENTS

| 5,631,817 | A * | 5/1997 | Minami ........................... 363/98 |
| 7,006,899 | B2 * | 2/2006 | Wakao et al. ................. 700/286 |
| 7,315,155 | B2 * | 1/2008 | Takeuchi ....................... 323/282 |
| 7,368,850 | B2 * | 5/2008 | Takeuchi ....................... 310/317 |
| 7,795,930 | B2 * | 9/2010 | Akahane et al. ............... 327/110 |
| 8,698,440 | B2 * | 4/2014 | Mourrier ....................... 318/503 |
| 2001/0043124 | A1 * | 11/2001 | Hilliard et al. .................. 331/65 |
| 2002/0060558 | A1 * | 5/2002 | Oki et al. ....................... 323/282 |
| 2008/0296085 | A1 * | 12/2008 | Suzuki .......................... 180/444 |

FOREIGN PATENT DOCUMENTS

| JP | 2000-291474 A | | 10/2000 |
| JP | 2000-337543 A | | 12/2000 |
| JP | 2003-167604 A | | 6/2003 |
| JP | 2003167604 | * | 6/2003 |
| JP | 2010-166719 A | | 7/2010 |

* cited by examiner

*Primary Examiner* — Timothy J Dole
*Assistant Examiner* — Shahzeb K Ahmad
(74) *Attorney, Agent, or Firm* — Posz Law Group, PLC

(57) ABSTRACT

A load drive control device is provided, which includes a pulse generator for generating pulse signals with a duty ratio to drive an inductive load, a feedback setting section for setting the duty ratio for feedback, a detection setting section for setting the duty ratio for detection of a natural vibration frequency of the inductive load, a natural vibration frequency setting section for setting the natural vibration frequency of the inductive load based on an actual current value detected at setting the duty ratio for detection, and a selection section for selecting the feedback setting section as a duty ratio setting section at a normal time and for selecting the detection setting section as the duty ratio setting section when a condition for detecting the natural vibration frequency is satisfied.

5 Claims, 9 Drawing Sheets

LOAD DRIVE CONTROL DEVICE

CROSS REFERENCE TO RELATED APPLICATION

The present application is based on Japanese Patent Application No. 2013-129685 filed on Jun. 20, 2013, disclosure of which is incorporated herein by reference.

TECHNICAL FIELD

The present disclosure relates to a load drive control device for controlling driving of an inductive load whose natural vibration frequency changes due to an external factor.

BACKGROUND

A known load drive control device controls driving of an inductive load by generating pulse signals with a predetermined duty ratio at a predetermined drive frequency.

In the inductive load driven at the predetermined drive frequency, resonance is generated when the drive frequency coincides substantially with a natural vibration frequency of the inductive load, or is substantially equal to the integral multiple of the natural vibration frequency of the inductive load. In order to prevent the resonance, it is necessary to determine a drive frequency based on the natural vibration frequency. However, when the natural vibration frequency changes due to an external factor, it is difficult to store the drive frequency in advance so that no resonance is generated.

When an inductive load is, for example, a solenoid of a hydraulic valve for controlling oil pressure applied to an automatic transmission, it is preferable to prevent the resonance because the resonance causes, for example, oil pressure pulsation of a valve body. However, because the viscosity of oil varies with, for example, temperature, it is difficult to store the drive frequency in advance so that no resonance is generated.

In this relation, JP-A-2003-167604 describes a control device of hydraulic equipment. In the control device, a stroke sensor detects the position of a spool linked to a plunger of a solenoid serving as an inductive load.

The stroke sensor makes it possible to switch the drive frequency based on a detected amplitude.

As described above, a known load drive control device may switch the drive frequency based on the amplitude detected by the stroke sensor. Consequently, the load drive control device may detect a resonant condition from the amplitude and switch the frequency to a drive frequency that causes no resonance generation.

The above load drive control device requires the stroke sensor in order to suppress the resonance. The stroke sensor is very expensive, and a man-hour for mounting the stroke sensor also arises.

SUMMARY

The present disclosure is made in view of the foregoing. It is an object of the present disclosure to provide a load drive control device that can suppress generation of resonance without using a stroke sensor.

According to an example of the present disclosure, a load drive control device for controlling driving of an inductive load is provided. The load drive control device includes a switching section, a pulse signal generating section, an actual current value detection section, a feedback setting section, a drive frequency setting section, a detection setting section, a natural vibration frequency setting section, and a selection section. The switching section is provided in an energizing path of the inductive load. The switching section flows an electric current to the inductive load when the switching section is ON. The pulse signal generating section drives the inductive load by generating pulse signals with a duty ratio at a drive frequency and by supplying the pulse signals to the switching section, wherein the drive frequency is predetermined. The actual current value detection section detects an actual current value of the inductive load. The feedback setting section sets the duty ratio for feedback based on a deviation between a target current value of the inductive load and the actual current value detected by the actual current value detection section so that the actual current value follows the target current value. The drive frequency setting section sets the drive frequency of the pulse signals. The detection setting section sets the duty ratio for detection, the duty ratio for detection being provided for detecting a natural vibration frequency of the inductive load. The natural vibration frequency setting section sets the natural vibration frequency of the inductive load based on the actual current value that is detected when the duty ratio for detection is set. At a normal time when a predetermined condition for detecting the natural vibration frequency is not satisfied, the selection section selects the feedback setting section as a duty ratio setting section, which sets the duty ratio in the pulse signal generating section. When the predetermined condition for detecting the natural vibration frequency is satisfied, the selection section selects the detection setting section as the duty ratio setting section, which sets the duty ratio in the pulse signal generating section. The detection setting section sets the duty ratio for detection, which is different in duty ration value from the duty ratio for feedback used by the pulse signal generating section before the duty ratio setting section switches over from the feedback setting section to the detection setting section. Based on the natural vibration frequency detected, the drive frequency setting section sets the drive frequency so as not to generate resonance.

According to the load drive control device, the drive frequency setting section sets the drive frequency based on a natural vibration frequency so that no resonance is generated. Consequently, it is possible to suppress generation of the resonance even when the natural vibration frequency changes due to an external factor.

Further, the detection setting section sets the duty ratio for detection, which is different in duty ratio value from the duty ratio for feedback used by the pulse signal generating section before the duty ratio setting section switches over from the feedback setting section to the detection setting section. Additionally, the natural vibration frequency setting section sets the natural vibration frequency based on an actual electric current value that is detected when the duty ratio for detection is set. In this way, since the natural vibration frequency is set from the actual electric current value flowing through the inductive load, it is possible to suppress generation of the resonance without using a stroke sensor.

DETAILED DESCRIPTION

Embodiments will be described based on the drawings. Between embodiments, like references are used to refer to like parts.

A load drive control device 10 for controlling driving of an inductive load will be described according to one embodiment.

Figure 1:
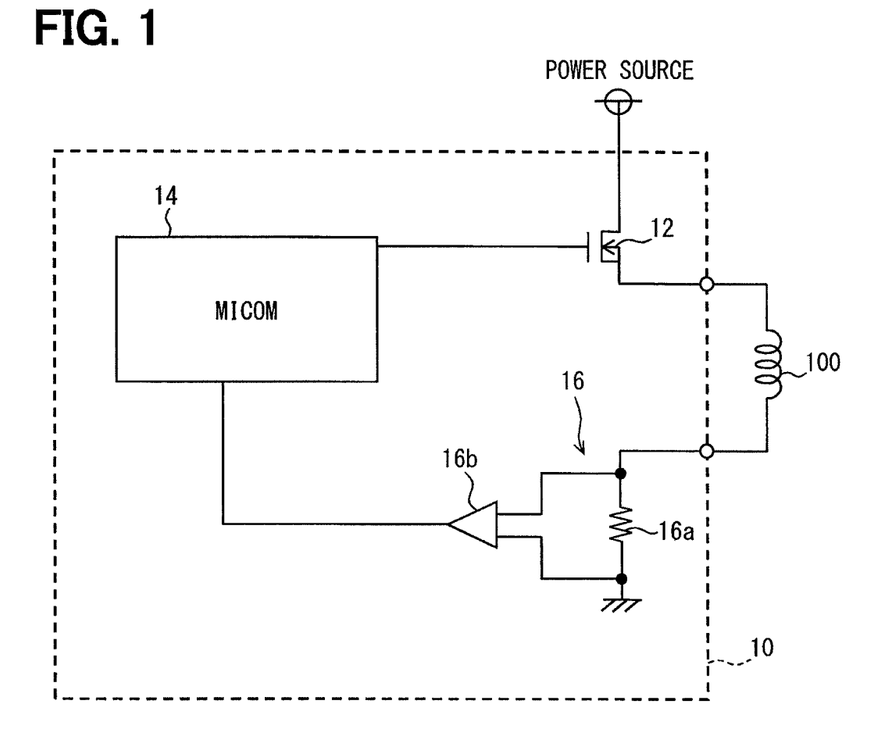
FIG. 1 is a diagram illustrating an outline configuration of a load drive control device according to an embodiment.

In the embodiment, a linear solenoid 100 of a hydraulic valve is employed as the inductive load, as shown in FIG. 1. The linear solenoid 100 is used, for example, to hydraulically control engagement and disengagement of a clutch and thus control an automatic transmission of a vehicle to a target gear stage.

The linear solenoid 100 includes a coil and a plunger. Energization of the coil is controlled to control an operation of the plunger and thus of a spool linked to the plunger.

An outline configuration of the load drive control device 10 will be described with reference to FIG. 1.

As shown in FIG. 1, the load drive control device 10 includes a switch 12, a microcomputer 14, and a electric current detection section 16.

The switch 12 is provided in an energizing path of the linear solenoid 100. ON and OFF of the switch 12 are controlled by pulse signals supplied from the microcomputer 14. An electric current is supplied to the linear solenoid 100 when the switch 12 is on, and the electric current supply is interrupted when the switch 12 is off.

In the embodiment, an MOSFET is employed as the switch 12, and the switch 12 is provided on the upstream side of the linear solenoid 100. Further, by inputting pulse signals as gate signals of the MOSFET, it is possible to implement switching between on and off of the switch 12 in accordance with the pulse signals. The switch 12 corresponds to a switching device and a switching means.

The microcomputer 14 includes a CPU, an ROM, an RAM, a register and the like. Based on input signals and a program stored in the ROM, the CPU, executes various kinds of calculations while temporarily using the RAM and the register as storage areas. Details of the microcomputer 14 will be described hereafter.

The electric current detection section 16 includes an electric current detection resistor 16a and an operational amplifier 16b. The electric current detection resistor 16a is connected in series to the linear solenoid 100. The operational amplifier 16b amplifies a voltage applied to both ends of the resistor 16a and outputs the voltage to the microcomputer 14. The electric current detection section 16 corresponds to the actual electric current value detection section.

One end of the resistor 16a is connected to a downstream side terminal of the linear solenoid 100, and the other end is grounded. In this way, the resistor 16a is provided so that a voltage generated between both ends is a voltage corresponding to a electric current (an actual electric current value) flowing through the linear solenoid 100.

A positive input terminal of the operational amplifier 16b is electrically connected to an upstream side terminal of the resistor 16a, and the negative input terminal of the operational amplifier 16b is electrically connected to a downstream side terminal of the resistor 16a. An output terminal of the operational amplifier 16b is electrically connected to the microcomputer 14. In this way, the operational amplifier 16b amplifies a voltage generated between both ends of the resistor 16a and output the voltage to the microcomputer 14.

Next, an outline configuration of the microcomputer 14 will be described based on FIG. 2.

Figure 2:
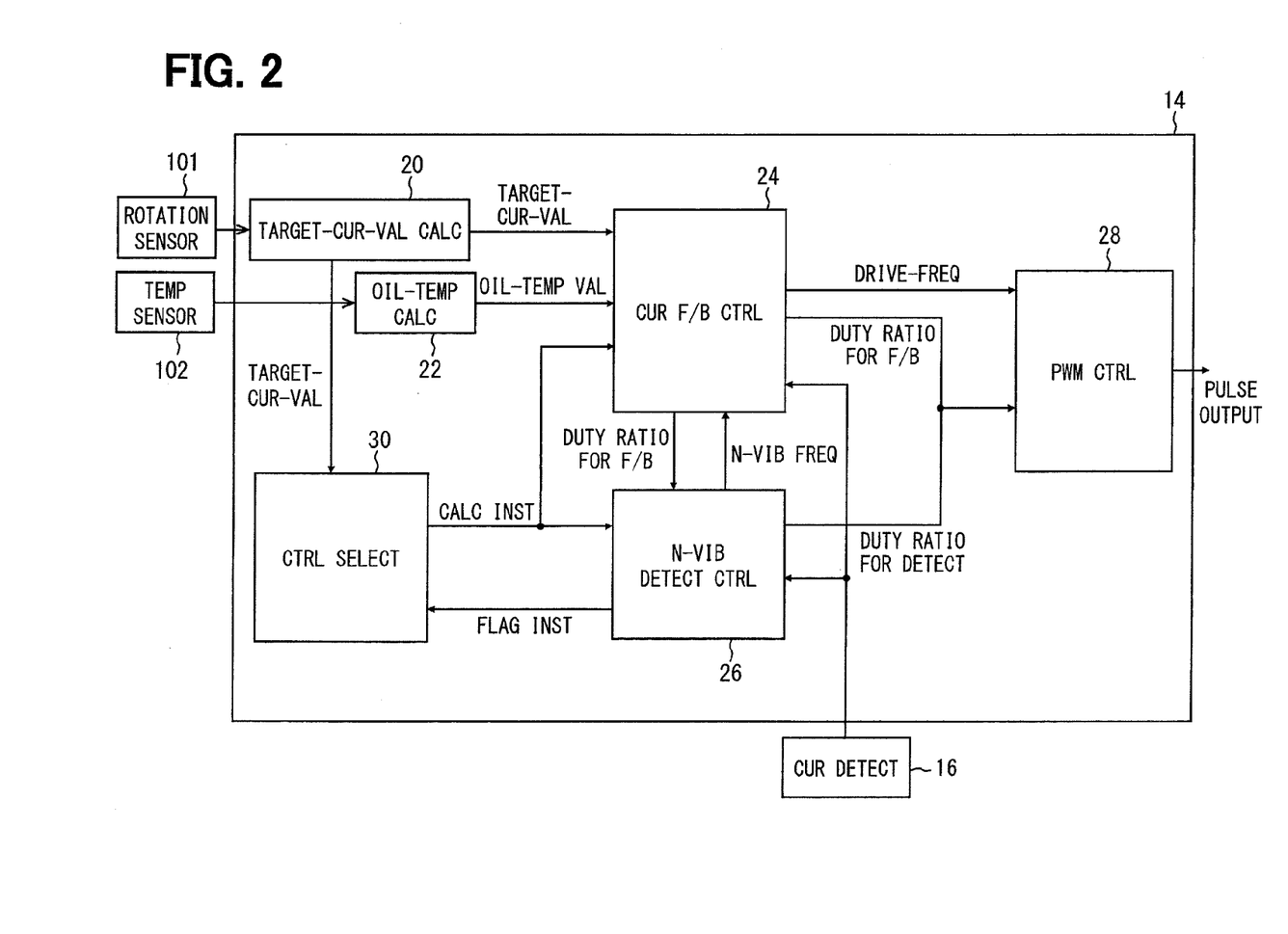
FIG. 2 is a diagram illustrating an outline configuration of a microcomputer shown in FIG. 1.

As shown in FIG. 2, the microcomputer 14 includes a target electric current value calculation section 20, an oil temperature calculation section 22, a electric current F/B control section 24, a natural vibration detection control section 26, a PWM control section 28, and a control selection section 30. The PWM control section 28 corresponds to a pulse signal generating section, and the control selection section 30 corresponds to a selection section. The natural vibration is abbreviated as N-VIB in the drawings.

In order to cause the linear solenoid 100, which is a controlled object, to have a target state, the target electric current value calculation section 20 calculates an electric current value that is to flow through the linear solenoid 100. That is, the target electric current value calculation section 20 calculates a target electric current value. In the embodiment, the target electric current value calculation section 20 calculates the target electric current value based on signals inputted from a rotation detection sensor 101 which detects a rotation speed of an input side of the automatic transmission and from a rotation detection sensor 101 which detects a rotation speed of an output side of the automatic transmission.

Based on the signals inputted from the rotation detection sensor 101s, the target electric current value calculation section 20 first rotation detection sensor 101 comprehends the rotation speed of the input side of the automatic transmission and the rotation speed of the output side of the automatic transmission. Then, based on the rotation speed of the input side and the rotation speed of the output side, the target electric current value calculation section 20 calculates a target oil pressure to be applied to the automatic transmission.

Next, based on the calculated target oil pressure, the target electric current value calculation section 20 calculates the target electric current value as the electric current value that is to flow through the linear solenoid 100. The relationship between the target oil pressure and the target electric current value is fixed in advance and stored in the ROM of the microcomputer 14 as, for example, a map. The target electric current value calculation section 20, based on a predetermined relationship between the target oil pressure and the target electric current value, calculates the target electric current value from the target oil pressure.

Based on a signal inputted from a temperature sensor 102 provided to the hydraulic valve, the oil temperature calculation section 22 temperature sensor 102 calculates an oil temperature in the hydraulic valve, that is, calculates an oil temperature value.

Based on the target electric current value and on an input signal from the electric current detection section 16, the electric current FIB control section 24 determines a drive frequency of PWM-controlled pulse signals and a feedback control duty ratio (hereafter described as an duty ratio for F/B). Additionally, based on the oil temperature value and a natural vibration frequency inputted from the natural vibration detection control section 26, the electric current FIB control section 24 determines the drive frequency of the pulse signals. Details of these will be described hereafter.

Based on the signal inputted from the electric current detection section 16, the natural vibration detection control section 26 calculates the natural vibration frequency. Additionally, based on the duty ratio for FIB inputted from the electric current F/B control section 24, the natural vibration detection control section 26 determines a duty ratio for detection, which is used when detecting the natural vibration frequency. Details of these will be described hereafter.

The PWM control section 28 outputs pulse signals in accordance with the set drive frequency and duty ratio. The PWM control section 28 includes a data storage register which defines the output pulse signals, although not shown. The drive frequency inputted from the electric current F/B control section 24 is stored in a drive frequency register. Meanwhile, the control duty ratio inputted from the electric current F/B control section 24 and the duty ratio for detection inputted from the natural vibration detection control section 26 are stored in a duty ratio register. Further, the PWM control section 28 outputs pulse signals in accordance with the duty ratios and the drive frequency which are stored in the respective registers. The pulse signals are input into the switch 12.

Based on the target electric current value inputted from the target electric current value calculation section 20, the control selection section 30 selects a control section (also called a duty ration setting section) which sets a duty ratio in the PWM control section 28. Specifically, the control selection section 30 selects one of the electric current F/B control section 24 or the natural vibration detection control section 26. Details thereof will be described hereafter.

Next, based on FIG. 3, explanation will be given on an outline configuration of the electric current F/B control section 24.

Figure 3:
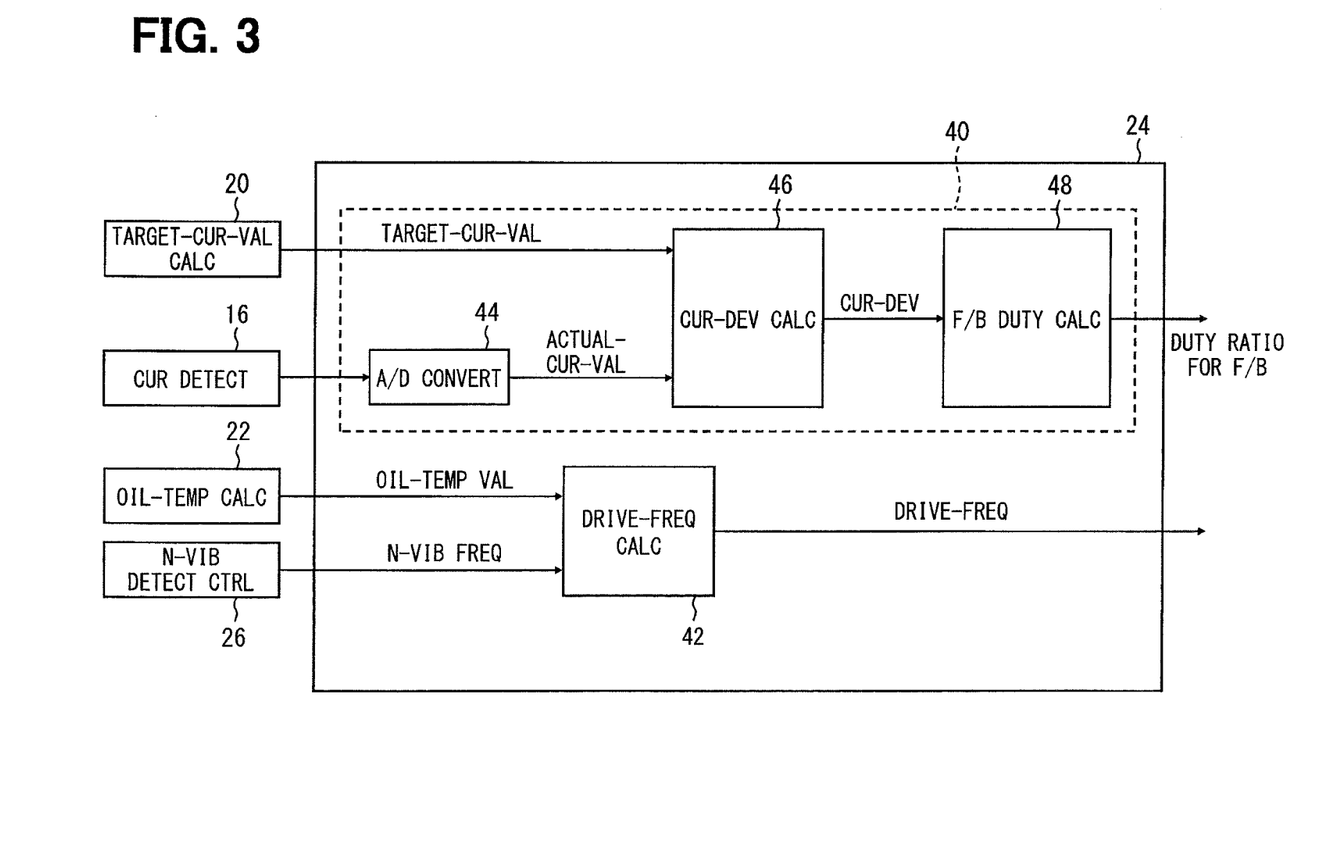
FIG. 3 is a diagram illustrating an outline configuration of a electric current F/B control section shown in FIG. 2.

As shown in FIG. 3, the electric current F/B control section 24 includes an F/B setting section 40 which, based on an electric current deviation between the target current value and the actual current value, sets the duty ratio for F/B so that the actual current value follows the target current value. The current F/B control section 24 further includes a drive frequency calculation section 42 which sets the drive frequency of the pulse signals. The F/B setting section 40 corresponds to the feedback setting section, and the drive frequency calculation section 42 corresponds to the drive frequency setting section.

The F/B setting section 40 includes an A/D converter 44, a current deviation calculation section 46, and an FIB duty calculation section 48.

The input terminal of the A/D converter 44 is electrically connected to the output terminal of the operational amplifier 16b. The A/D converter 44 A/D converts an input signal from the operational amplifier 16b, that is, the actual current value, and outputs the actual current value to the current deviation calculation section 46.

The current deviation calculation section 46 calculates a current deviation between the target current value calculated by the target current value calculation section 20 and the actual current value inputted from the A/D converter 44. The current deviation calculation section 46 outputs the calculated current deviation to the F/B duty calculation section 48.

The F/B duty calculation section 48, based on the calculated current deviation, calculates a duty ratio for F/B for F/B controlling the linear solenoid 100 so that the actual current value follows the target current value. Further, the F/B duty calculation section 48, as well as saving the calculated duty ratio for F/B in the RAM, outputs the calculated duty ratio for F/B to the PWM control section 28. The duty ratio for F/B output to the PWM control section 28 is stored in the duty ratio resistor.

Meanwhile, the drive frequency calculation section 42 calculates the drive frequency based on the oil temperature value calculated in the oil temperature calculation section 22 and the natural vibration frequency calculated in the natural vibration detection control section 26. Further, the drive frequency calculation section 42 outputs the calculated drive frequency to the PWM control section 28. The drive frequency output to the PWM control section 28 is stored in the drive frequency register.

Next, explanation will be given on a process which the current F/B control section 24 executes.

The current F/B control section 24 executes a predetermined process in a period in which the current F/B control section 24 is receiving a calculation instruction from the control selection section 30, that is, in a period in which the current F/B control section 24 is being selected as a control section which controls the PWM control section 28.

First, based on FIG. 4, explanation will be given on a process which the F/B setting section 40 executes.

Figure 4:
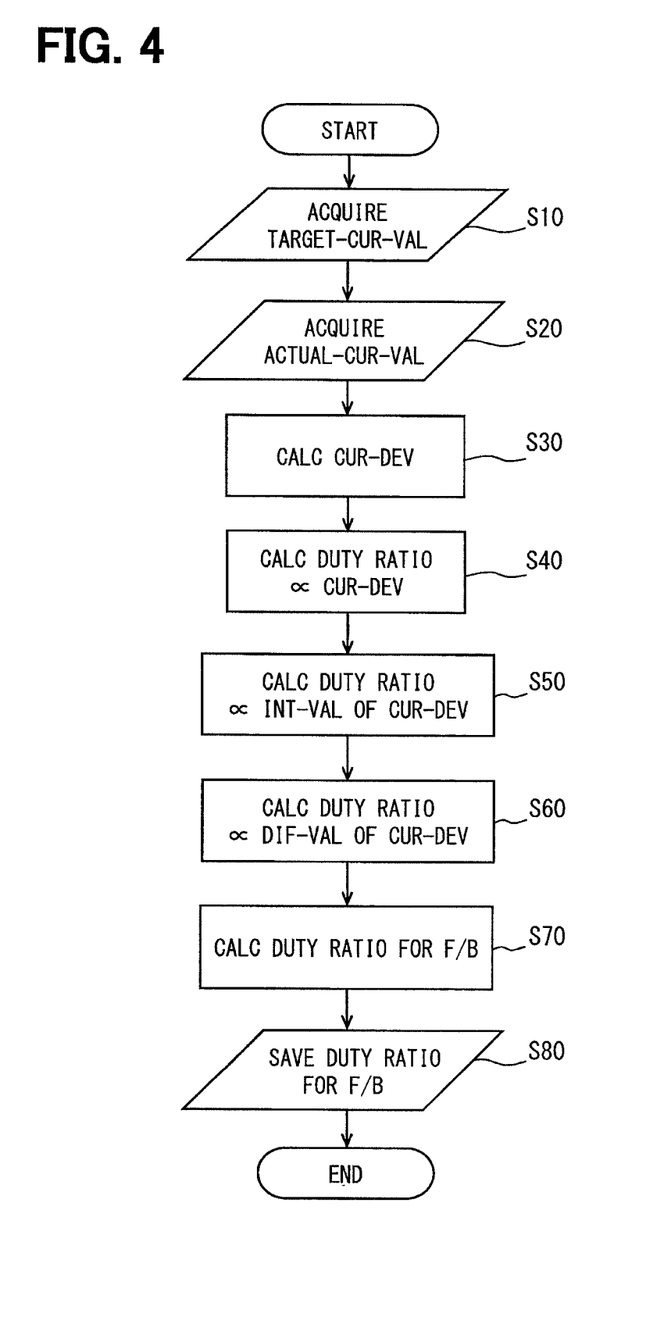
FIG. 4 is a flowchart illustrating a process executed in an F/B setting section shown in FIG. 3.

The F/B setting section 40 executes a series of steps shown in FIG. 4 in each pulse signal generation cycle.

The current deviation calculation section 46 acquires the target current value inputted from the target current value calculation section 20 (S10). Next, the current deviation calculation section 46 acquires the actual current value based on a signal inputted from the A/D converter 44 (S20). Further, the current deviation calculation section 46 calculates a current deviation based on the acquired target current value and actual current value, and outputs the current deviation to the F/B duty calculation section 48 (S30).

Next, based on the input current deviation, the F/B duty calculation section 48 carries out calculation of a duty ratio proportional to the current deviation (S40), calculation of a duty ratio proportional to the integrated value of the current deviation (S50), and calculation of a duty ratio proportional to the differential value of the current deviation (S60). Further, the F/B duty calculation section 48 calculates the sum of the three duty ratios calculated at S40 to S60, as an duty ratio for F/B, which is to be output to the PWM control section 28 (S70). Next, the F/B duty calculation section 48, as well as saving the calculated duty ratio for F/B in the RAM, outputs the calculated duty ratio for F/B to the PWM control section 28 (S80). The duty ratio for F/B output to the PWM control section 28 is stored in the duty ratio register of a PWAM drive section. Then, the series of steps is ended.

Next, based on FIG. 5, explanation will be given on a process which the drive frequency calculation section 42 executes.

Figure 5:
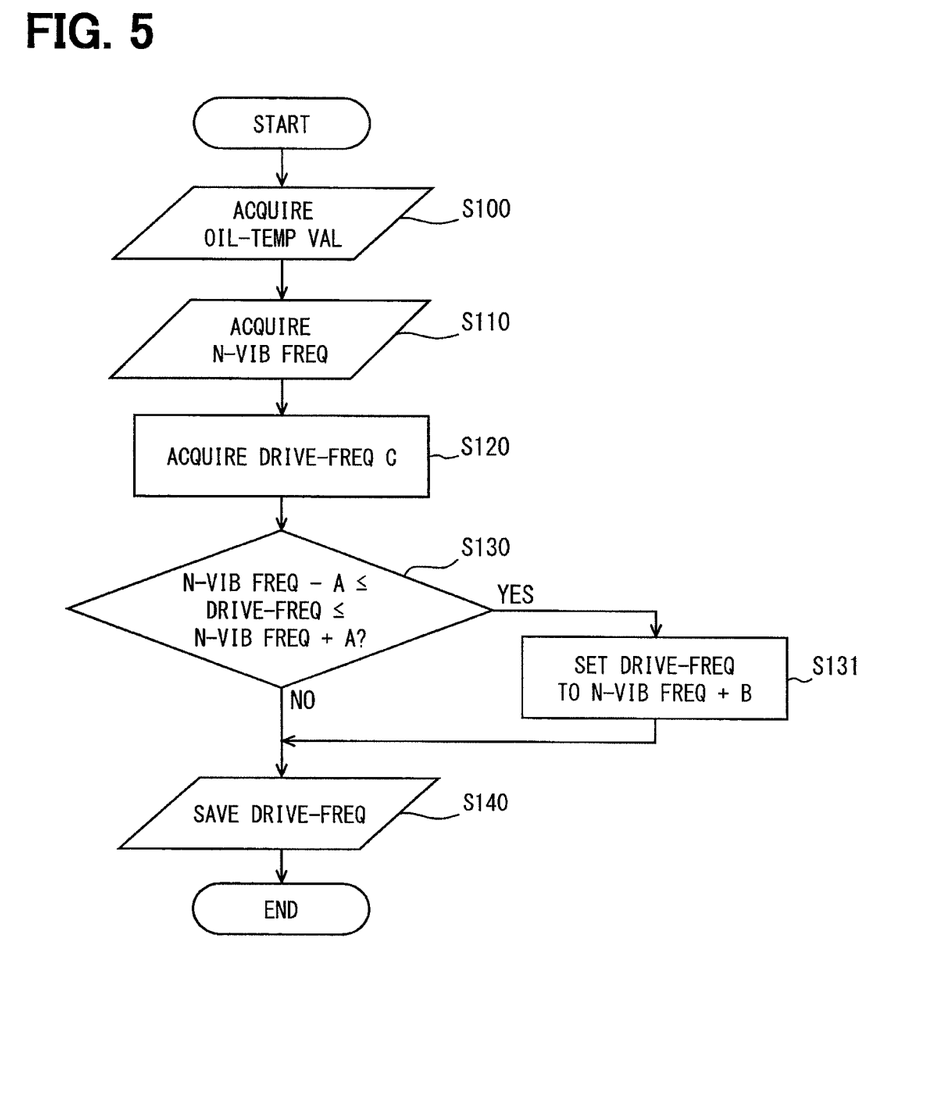
FIG. 5 is a flowchart illustrating a process executed in a drive frequency calculation section shown in FIG. 3.

The drive frequency calculation section 42 repeatedly executes a series of steps shown in FIG. 5.

First, the drive frequency calculation section 42 acquires the oil temperature value inputted from the oil temperature calculation section 22 (S100). Next, the drive frequency calculation section 42 acquires the natural vibration frequency stored in the RAM from the natural vibration detection control section 26 (S110).

Also, the drive frequency calculation section 42 acquires, from storage data, a drive frequency corresponding to the oil temperature value acquired at S100 (S120). The storage data are such that an optimum drive frequency is set in advance for each oil temperature, and the storage data are stored in the ROM.

Further, the drive frequency calculation section 42 determines whether or not the drive frequency acquired at S120 coincides substantially with the natural vibration frequency acquired at S110 (S130). Specifically, the drive frequency calculation section 42 determines whether or not the drive frequency exists between a predetermined value A subtracted from the natural vibration frequency and the predetermined value A added to the natural vibration frequency. For example, when the natural vibration frequency is taken to be 100 Hz and the predetermined value A is taken to be 20 Hz, the drive frequency calculation section 42 determines whether or not the drive frequency is in a range of 80 Hz or more and 120 Hz or less. The predetermined value A is stored in advance in the ROM.

When determining that the drive frequency does not coincide with the natural vibration frequency, the drive frequency calculation section 42 outputs the drive frequency acquired at S120 to the PWM control section 28 as a drive frequency which defines the pulse signals. That is, the drive frequency calculation section 42 stores the drive frequency in the drive frequency register of the PWM control section 28 (S140).

Meanwhile, when determining that the drive frequency coincides substantially with the natural vibration frequency, the drive frequency calculation section 42 adds a predetermined value B to the natural vibration frequency acquired at S110 and sets the sum as the drive frequency (S131). The predetermined value B, by being added to the natural vibration frequency, is set to be a value larger than the predetermined value A so as to form a frequency that generates no resonance. When the natural vibration frequency is taken to be 100 Hz, and the predetermined value A is taken to be 20 Hz, as heretofore described, the predetermined value B is set to be, for example, 50 Hz. The predetermined value B is also stored in advance in the ROM of the microcomputer 14. Also, a plurality of each of the predetermined values A and B are stored so as to be appropriately set in accordance with the natural vibration frequency.

Further, the drive frequency calculation section 42 outputs the drive frequency, which is set at S131, to the PWM control section 28 as the drive frequency which defines the pulse signals, and store the drive frequency in the drive frequency register (S140). Then, the series of steps is ended.

Next, based on FIG. 6, explanation will be given on an outline configuration of the natural vibration detection control section 26.

Figure 6:
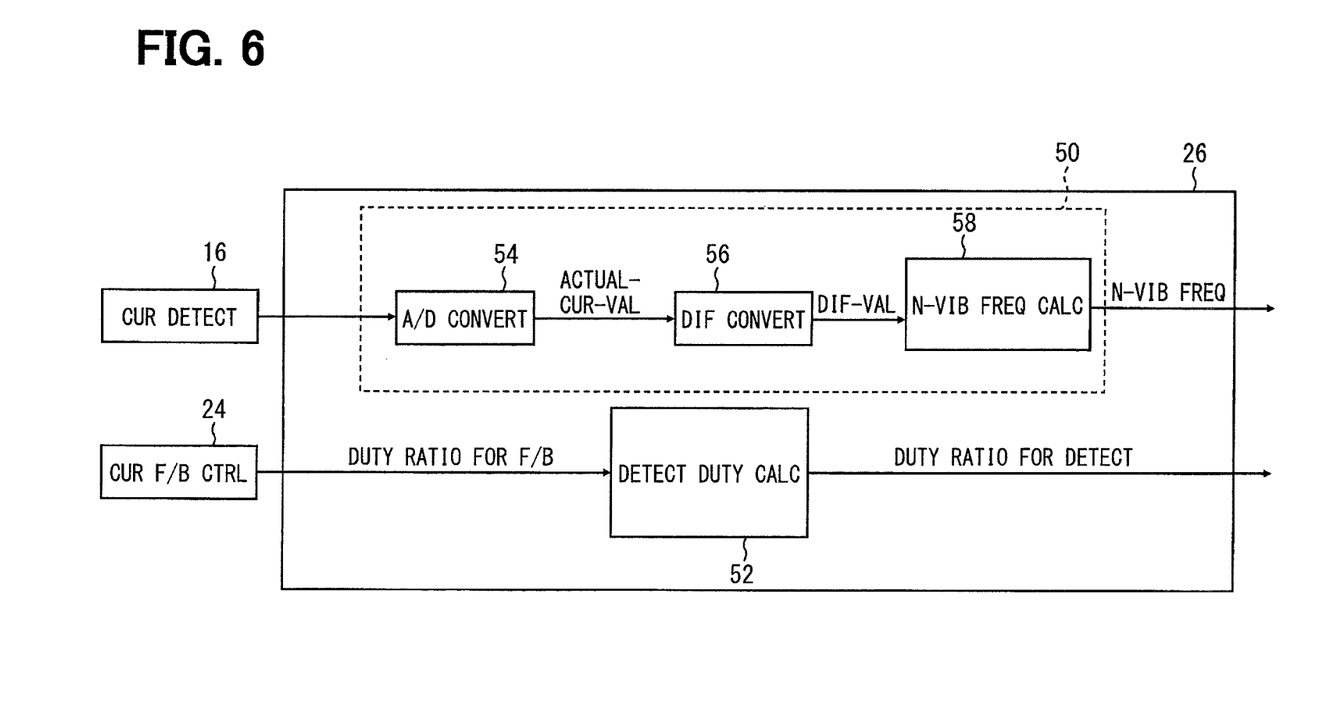
FIG. 6 is a diagram illustrating an outline configuration of a natural vibration detection control section shown in FIG. 2.

As shown in FIG. 6, the natural vibration detection control section 26 includes a natural vibration frequency setting section 50 and a detection duty calculation section 52. The natural vibration frequency setting section 50 sets the natural vibration frequency based on the actual current value that is detected when the duty ratio for detection is set. The detection duty calculation section 52 sets the duty ratio for detection. The natural vibration frequency setting section 50 corresponds to the natural vibration frequency setting section, and the detection duty calculation section 52 corresponds to the detection setting section.

The natural vibration frequency setting section 50 has an A/D converter 54, a differential conversion section 56, and a natural vibration frequency calculation section 58.

The input terminal of the A/D converter 54 is electrically connected to the output terminal of the operational amplifier 16b. The A/D converter 54 A/D converts an input signal from the operational amplifier 16b, that is, the actual current value, and outputs the actual current value to the differential conversion section 56.

The differential conversion section 56 differentially converts the actual current value to a differential value, and outputs the differential value to the natural vibration frequency calculation section 58.

The natural vibration frequency calculation section 58 calculates the natural vibration frequency based on the differential value inputted from the differential conversion section 56.

Further, the natural vibration frequency calculation section 58 stores the calculated natural vibration frequency in the RAM.

Meanwhile, the detection duty calculation section 52 acquires the duty ratio for F/B stored in the RAM from the current F/B control section 24, and calculates a duty ratio for detection based on the duty ratio for F/B. Further, the detection duty calculation section 52 outputs the calculated duty ratio for detection to the duty ratio register of the PWM control section 28. Unlike the duty ratio for F/B is set so that the actual current value follows the target current value, the duty ratio for detection is set in order to detect the natural vibration frequency. Specifically, the duty ratio for detection is set so that the actual current value changes and that the actual current value is of a size such that the condition of the clutch of the automatic transmission is not switched.

Next, based on FIG. 7, explanation will be given on a process which the natural vibration detection control section 26 executes.

The natural vibration detection control section 26 executes a predetermined process in a period in which the natural vibration detection control section 26 is receiving a calculation instruction from the control selection section 30, that is, in a period in which the natural vibration detection control section 26 is being selected as the control section which controls the PWM control section 28. The natural vibration detection control section 26 repeatedly executes the series of steps shown in FIG. 7.

First, the differential conversion section 56 acquires the actual current value based on the signal inputted from the A/D converter 54 (S200). Next, the differential conversion section 56 differentiates the acquired actual current value and outputs the differential value to the natural vibration frequency calculation section 58 (S210).

Next, the natural vibration frequency setting section 50 acquires the previous value of a peak time point stored in the RAM (S220). Further, the natural vibration frequency calculation section 58 determines whether or not the differential value converted at S210 is peak (S230). When the present value is a decrease with respect to the previous value that was increased, the natural vibration frequency calculation section 58 determines at S230 that the differential value is peak.

When determining that the differential value is not peak, the natural vibration frequency calculation section 58 acquires the duty ratio for F/B stored in the RAM from the current F/B control section 24 (S240), and next, acquires an addition pattern to be added to the duty ratio for F/B from the storage data stored in the ROM (S250). The addition pattern is set so that the duty ratio is increased and next decreased with respect to the duty ratio for F/B in order that the actual current value is changed so as to have a plurality of peaks.

Specifically, the addition pattern is set so as to output an additional value C[%] for a time t1 [ms], and next, output an additional value D[%], which is smaller than the additional value C, for a time t2 [ms]. For example, 15[%] is set as the additional value C, 10 [ms] is set as the time t1, on the order of 0[%] to −10[%] is set as the additional value D, and 20 [ms] is set as the time t2.

Further, the natural vibration frequency calculation section 58 adds the addition pattern acquired at S250 to the duty ratio for F/B acquired at S240 and calculates the duty ratio for detection (S260). Further, the natural vibration frequency calculation section 58 outputs the calculated duty ratio for detection to the PWM control section 28 and stores the calculated duty ratio for detection in the duty ratio register (S270). The duty ratio for F/B and the duty ratio for detection are stored in the same duty ratio register.

Meanwhile, when determining that the differential value is peak, the natural vibration frequency calculation section 58 determines whether or not the previous value of the peak time point exists (S231). That is, the natural vibration frequency calculation section 58 determines whether or not an invalid value is set as the previous value acquired at S220. When the previous value does not exist, that is, when an invalid value is set as the previous value, the natural vibration frequency calculation section 58 stores a counter value of a built-in timer of the microcomputer 14. That is, the natural vibration frequency calculation section 58 stores a present time point in the RAM as the previous value of the peak time point (S232). As described above, when the present value is decreased with respect to the previous value that was increased, it is determined that the differential value is peak. Thus, the time point of the present value is taken to be the peak time point. At S232, the natural vibration frequency calculation section 58 stores the time point of the present value as the previous value. Further, the natural vibration frequency calculation section 58 executes the heretofore described steps at and after S240.

Also, when determining at S231 that the previous value exists, the natural vibration frequency calculation section 58 calculates a natural vibration frequency f0 from a difference $\Delta T$ between the present time point which is the counter value of the built-in timer, that is, the present value, and the previous value acquired at S220 (S233). The natural vibration frequency f0 can be obtained from $f0=1/\Delta T$.

When completing the calculation of the natural vibration frequency, the natural vibration frequency calculation section 58 sets an invalid value as the previous value of the peak time point stored in the RAM (S234). Next, the natural vibration frequency calculation section 58 stores the natural vibration frequency calculated at S233 in the RAM (S235). Also, to the control selection section 30, the natural vibration frequency calculation section 58 outputs a flag instruction to set a completion flag indicating the natural vibration frequency calculation completion, and sets the completion flag on the RAM of the control selection section 30 (S236). Further, the natural vibration frequency calculation section 58 executes the heretofore described steps at and after S240.

Next, based on FIG. 8, explanation will be given on a process which the control selection section 30 executes.

Figure 8:
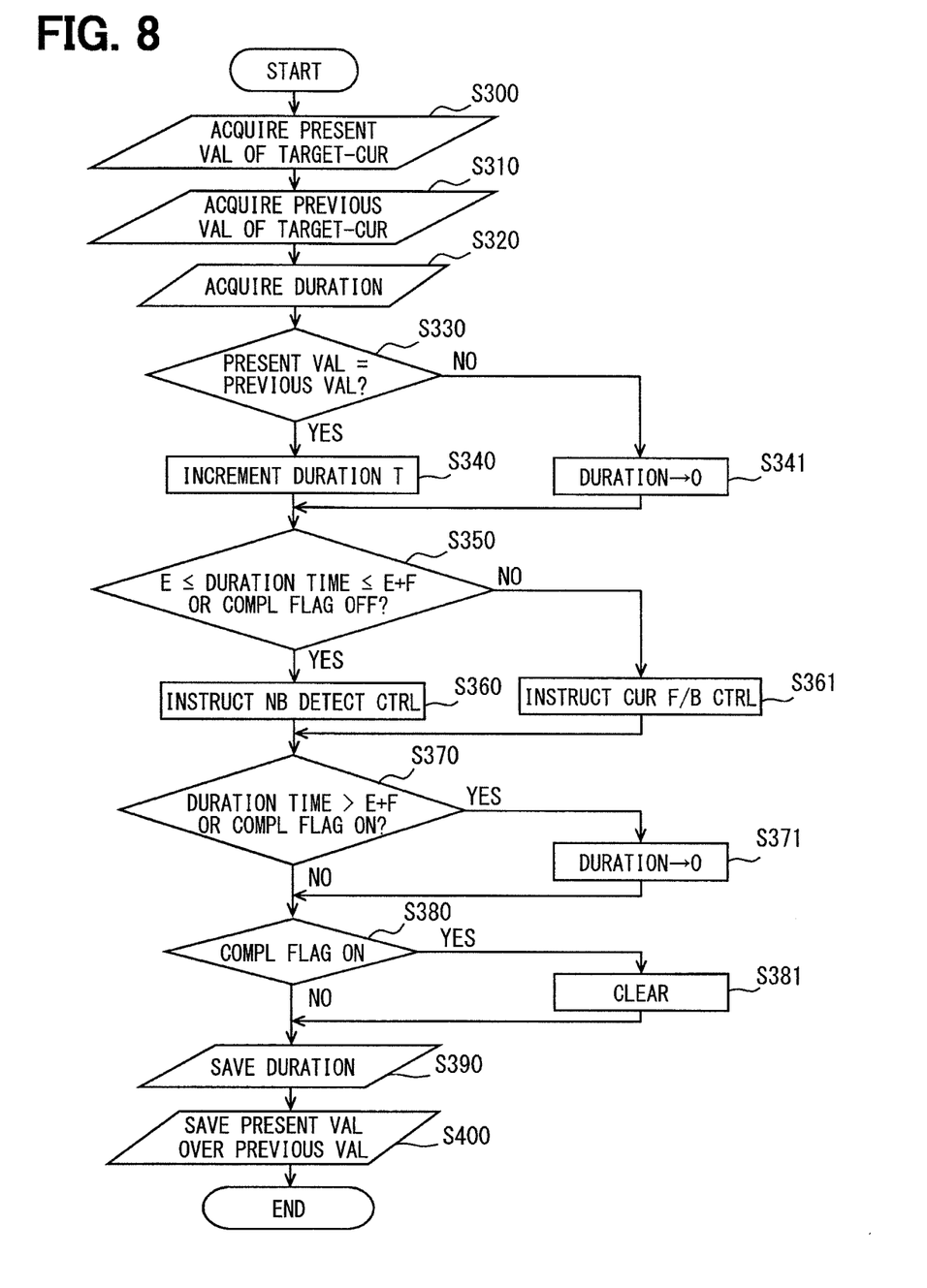
FIG. 8 is a flowchart illustrating a process executed in a control selection section shown in FIG. 2.

The control selection section 30 repeatedly executes a series of steps shown in FIG. 8 with the microcomputer 14 being powered on.

First, the control selection section 30 acquires the target current value inputted from the target current value calculation section 20, that is, the present value of the target current (S300). Next, the control selection section 30 acquires the previous value of the target current from the storage data stored in the RAM (S310). Next, the control selection section 30 acquires a duration time, for which the target current continues at a constant value, from the storage data of the RAM (S320).

Further, the control selection section 30 determines whether or not the present value acquired at S300 coincides with the previous value acquired at S310 (S330). When determining that the present value coincides with the previous value, the control selection section 30 increments the counter value of the built-in timer which measures the duration time (S340).

Meanwhile, when determining that the present value does not coincide with the previous value, the control selection section 30 sets 0 (zero) as the duration time (S341). That is, the control selection section 30 resets the counter value of the built-in timer.

Following S340 and S341, the control selection section 30 determines whether or not one of the duration time or the completion flag satisfies predetermined conditions (S350). The control selection section 30 determines whether or not the duration time is within a predetermined range after the target current value has been constant. The predetermined range is set so that there is less effect on the current F/B control, and it is possible to stably detect the natural vibration frequency. Specifically, the predetermined range is defined by an elapsed time E after the target current value has been constant and a time F needed to calculate the natural vibration frequency.

Specifically, the control selection section 30 determines at S350 whether or not the duration time is within a range of E or more and (E+F) or less. Meanwhile, the control selection section 30 determines whether or not the completion flag is set on the RAM.

When determining that the duration time is within the range of E or more and (E+F) or less, or that the completion flag is not set, the control selection section 30 selects the natural vibration detection control section 26 as the control section which sets the duty ratio in the PWM control section 28. That is, the control selection section 30 instructs the natural vibration detection control section 26 to perform the calculation (S360). When the current F/B control section 24 is selected so far, the control section is switched from the current F/B control section 24 to the natural vibration detection control section 26.

Meanwhile, when determining that the duration time does not exist within the range of E or more and (E+F) or less, and that the completion flag is set, the control selection section 30 selects the current F/B control section 24 as the control section which sets the duty ratio in the PWM control section 28. That is, the control selection section 30 instructs the current F/B control section 24 to compute (S361). When the natural vibration detection control section 26 is selected so far, the control section is switched from the natural vibration detection control section 26 to the current F/B control section 24.

Following S360 and S361, the control selection section 30 determines again whether or not one of the duration time or the completion flag satisfies the predetermined conditions (S370). The control selection section 30 determines at S370 whether or not the duration time has exceeded the heretofore mentioned (E+F). Also, the control selection section 30 determines whether or not the completion flag is set on the RAM.

When determining that the duration time does not exceed (E+F), that is, that the duration time is (E+F) or less and the completion flag is not set, the control selection section 30 determines whether or not the completion flag is set (S380). Meanwhile, when determining that the duration time has exceeded (E+F), or that the completion flag is set, the control selection section 30 sets 0 (zero) as the duration time (S371). That is, the control selection section 30 resets the counter value of the built-in timer.

When determining at S380 that the completion flag is not set, the control selection section 30 stores the duration times set at S340, S341, and S371 in the RAM (S390). That is, the control selection section 30 stores the counter value of the built-in timer in the RAM. Next, the control selection section 30 stores the present value of the target current in the RAM as the previous value (S400).

Meanwhile, when determining at S380 that the completion flag is set, the control selection section 30 clears the completion flag of the RAM (S381). Further, the control selection section 30 executes the heretofore described S390 and S400.

Next, based on FIG. 9, explanation will be given on an operation of switching (selection) between the current F/B control and the natural vibration detection control by the control selection section 30.

Figure 9:
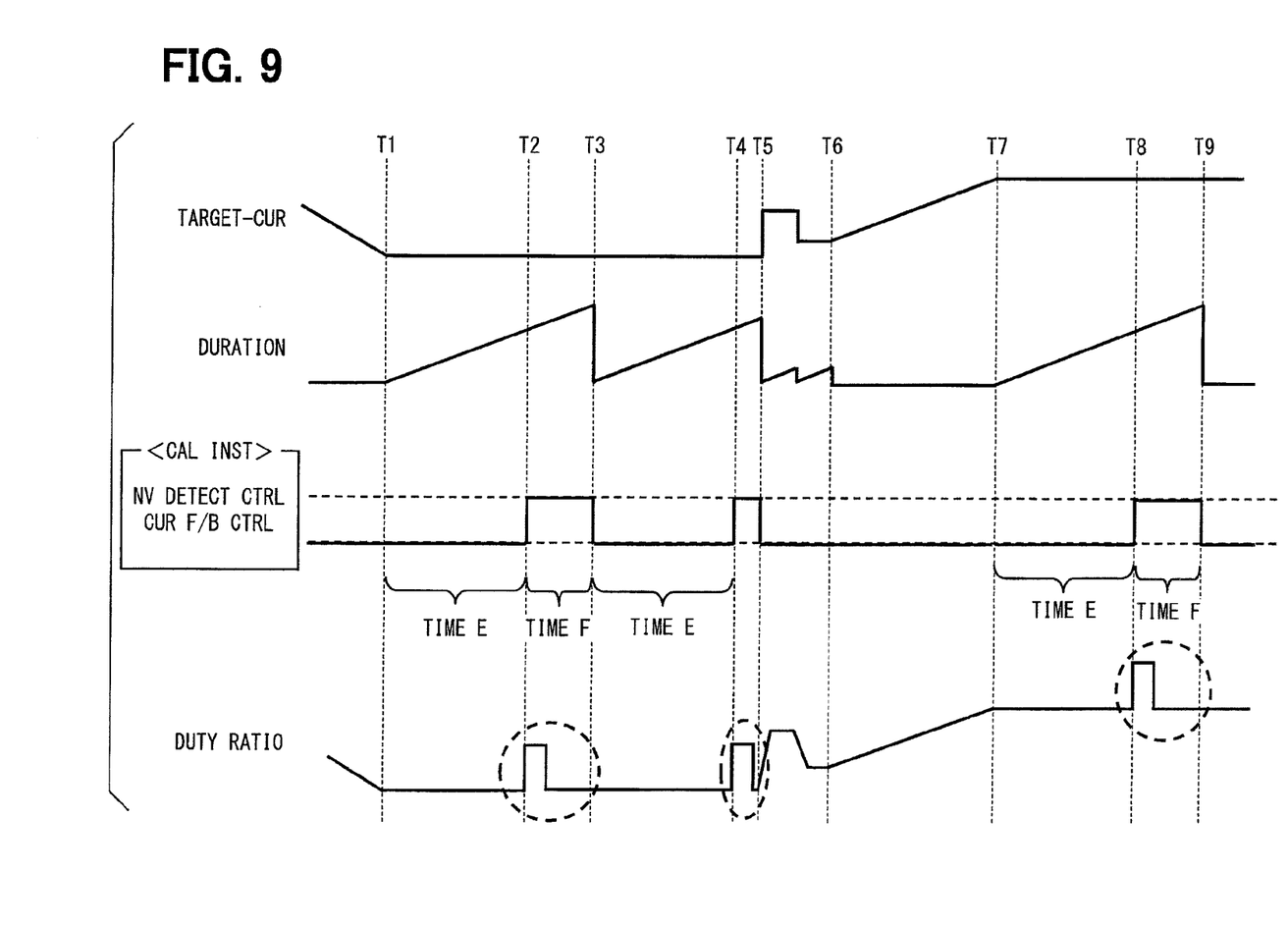
FIG. 9 is a time chart for illustrating an operation of switching (selection) between electric current F/B control and natural vibration detection control.

FIG. 9 shows the target current value, the duration time for which the target current value is made constant, the duty ratio which is set in the PWM control section 28, and a calculation instruction signal which is issued by the control selection section 30. The dashed lines shown in FIG. 9 show the duty ratio for detection.

Also, the period up to Timing T1 shown in FIG. 9 corresponds to a speed transition period in which the clutch is changed from an engaged state to a disengaged state in the automatic transmission, and the period from Timing T1 to Timing T5 corresponds to the disengaged state of the clutch. The period from Timing T5 to Timing T7 corresponds to a speed transition period in which the clutch is changed from the disengaged state to the engaged state, and the period at and after Timing T7 corresponds to the engaged state of the clutch.

As no oil pressure has to be changed in the disengaged state from Timing T1 to Timing T5 and in the engaged state at and after Timing T7, the target current value is set constant. In the embodiment, pulse signals with a predetermined duty ratio (a constant duty ratio) are supplied to a coil at a predetermined drive frequency (a low frequency), at these timings, in order to secure a micro-vibration (a so-called dither) in a stroke direction of the plunger. By securing the dither in this way, it is possible to reduce frictional resistance compared with a stroke from a rest state and thus to improve the responsiveness of the plunger when switching to the speed transition period.

Meanwhile, the period up to Timing T1 and the period from Timing T5 to Timing T7 are the speed transition periods, wherein the target current value is changed in order to change oil pressure. Consequently, the duty ratio also changes. In the speed transition periods, it is necessary to carry out control to cause the actual current value to follow the target current value with high accuracy.

In this way, it is necessary in the speed transition periods to carry out control to cause the actual current value to follow the target current value with high accuracy, but in the other period, that is, in the period in which the target current value is constant, there is less effect unless the current FIB control is carried out. In the embodiment, the linear solenoid 100 is used as a natural vibration frequency detection sensor in one portion of the period in which the target current value is constant. Further, the linear solenoid 100 is used as an actuator for the current F/B control in the other period.

As the target current value is made constant from Timing T1, the counter value of the built-in timer which measures the duration time is incremented from Timing T1 as time elapses. When a predetermined time E elapses with Timing T1 as a reference, and Timing T2 is reached, a calculation instruction output object is switched from the current F/B control section 24 to the natural vibration detection control section 26.

There is no change in the target current value from Timing T2 until Timing T3 by which a predetermined time F has elapsed since Timing T2. Consequently, in this period, the detection duty calculation section 52 of the natural vibration detection control section 26 calculates the duty ratio for detection, and the PWM control section 28 outputs the pulse signals based on the duty ratio for detection. Further, the natural vibration frequency setting section 50 calculates the natural vibration frequency from the actual current value at this time and stores the calculated natural vibration frequency in the RAM.

When the predetermined time F with respect to Timing T2 has elapsed, and Timing T3 is reached, the duration time is cleared to 0 (zero). That is, the counter value is reset. As a result of this, the calculation instruction output object switches from the natural vibration detection control section 26 to the current F/B control section 24.

Further, because the target current value still remains constant, when the predetermined time E with respect to Timing T3 has elapsed and Timing T4 is reached, the calculation instruction output object switches from the current F/B control section 24 to the natural vibration detection control section 26.

However, at Timing T5, a change occurs in the target current value before the predetermined time F with respect to Timing T4 has elapsed. Consequently, the duration time is cleared to 0 (zero) at Timing T5. By so doing, the calculation instruction output object switches from the natural vibration detection control section 26 to the current F/B control section 24. That is, no natural vibration frequency is calculated. In this way, the control switches to the current F/B control immediately when the target current value changes.

Further, when the target current value becomes constant at Timing T7, the predetermined time E with respect to Timing T7 has elapsed and Timing T8 is reached, the calculation instruction output object switches from the current F/B control section 24 to the natural vibration detection control section 26.

Then, as there is no change in the target current value until Timing T9 by which the predetermined time F with respect to Timing T8 has elapsed, the natural vibration frequency is calculated.

Next, explanation will be given on advantages of the load drive control device 10.

In the load drive control device 10 according to the embodiment, the drive frequency calculation section 42 sets the drive frequency based on the oil temperature value and the natural vibration frequency so that no resonance is generated, as shown in FIG. 5. Consequently, it is possible to suppress generation of the resonance even when the viscosity of oil changes due to a change in oil temperature and the natural vibration frequency accordingly changes. It is possible to suppress generation of the resonance at, for example, the drive frequency for securing the dither.

Further, the detection duty calculation section 52 calculates the duty ratio different from the duty ratio for F/B by adding the addition pattern to the duty ratio for F/B before the switching, as shown in FIG. 5. Further, the natural vibration frequency setting section 50 calculates the natural vibration frequency based on the actual current value that is detected when the duty ratio for detection is set. In this way, as the natural vibration frequency is calculated from the actual current value flowing through the linear solenoid 100, it is possible to suppress generation of the resonance even without using a stroke sensor. In other words, because the linear solenoid 100 is used as a sensor for detecting the natural vibration frequency, it is possible to simplify the configuration of the load drive control device 10.

Figure 7:
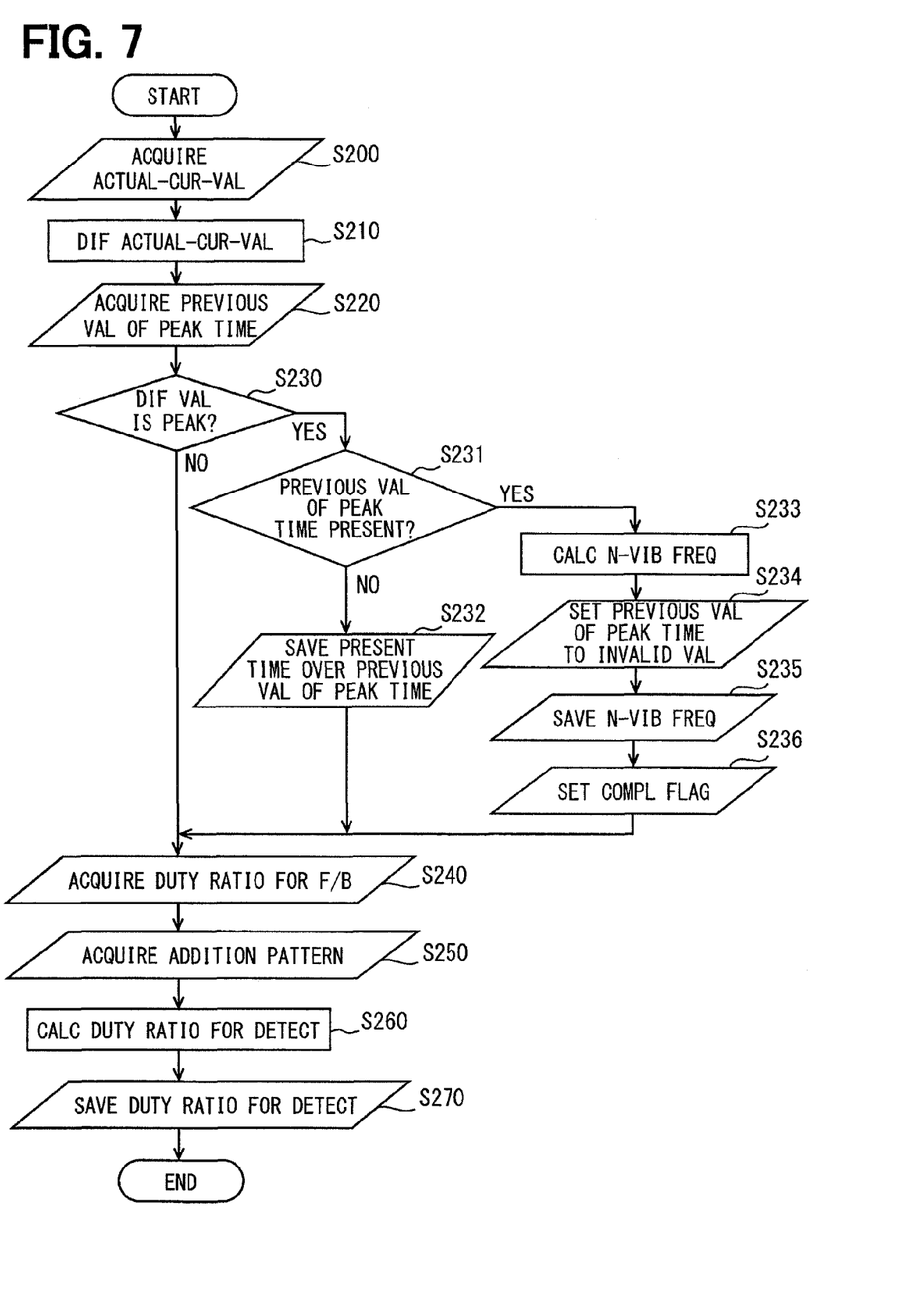
FIG. 7 is a flowchart illustrating a process executed in the natural vibration detection control section.

Further, the natural vibration frequency setting section 50 differentiates the actual current value and acquires the peak time point, and calculates the natural vibration frequency from a plurality of peak time points, as shown in FIG. 7. Consequently, it is possible to calculate the natural vibration frequency of the linear solenoid 100 with a small amount of calculation.

Further, as shown in FIGS. 8 and 9, under a situation where the target current value is constant, when the predetermined time E has elapsed since the target current became constant, the control selection section 30 selects the natural vibration detection control section 26 for the predetermined time F, and selects the current F/B control section 24 in the other period. Specifically, the natural vibration frequency is calculated in the period in which the duty ratio is constant, rather than in the period in which the duty ratio changes. Consequently, it is possible to stably detect the natural vibration frequency.

Further, it is necessary to cause the actual current value to follow the target current value with high accuracy in the period in which the target current value changes, for example, in the speed transition period. In the embodiment, the natural vibration frequency is not calculated in the speed transition period. Rather, in the period in which the target current value is constant, the natural vibration frequency is calculated after the predetermined time E has elapsed since the target current value becomes constant. That is, one portion of the period in which the target current value is constant is taken to be a natural vibration frequency calculation period. Consequently, it is possible to suppress an effect on the current F/B control, particularly, on the current F/B control in the speed transition period.

Further, as shown in FIGS. 8 and 9, when the target current value changes after the control selection section 30 switches the control section to the natural vibration detection control section 26, the control selection section 30 switches the control section to the current F/B control section 24 even before the predetermined time F has elapsed. Because the control is switched to the current F/B control immediately when the target current value changes, it is possible to effectively suppress an effect on the current F/B control.

Embodiments of the present disclosure are not limited to the above-illustrated embodiments and can have various forms and modification modifications.

The above-illustrated embodiment uses the target current value as a condition for the control selection section 30 to select the control section, which sets the duty ratio in the PWM control section 28. In other embodiments, a shift position may be used as the condition for the selection. For example, the control selection section 30 may select the natural vibration detection control section 26 in order to detect the natural vibration frequency in a parking (P) range or a neutral (N) range, and selects the current FIB control section 24 in the other range.

The above-illustrated embodiment calculates the natural vibration frequency by differentiating the actual current value. In other embodiments, the natural vibration frequency may be calculated from an area change of the actual current value.

In the above-illustrated embodiment, the linear solenoid 100 of the hydraulic valve for controlling the oil pressure of the automatic transmission is an example of the inductive load. However, the inductive load is not limited to the above example and may be any load that can be driven by PWM control.

What is claimed is:

1. A load drive control device for controlling driving of an inductive load, the load drive control device comprising:
a switching section provided in an energizing path of the inductive load, the switching section flowing an electric current to the inductive load when the switching section is ON;
a pulse signal generating section for driving the inductive load by generating pulse signals with a duty ratio at a drive frequency and by supplying the pulse signals to the switching section, wherein the drive frequency is predetermined;
an actual current value detection section for detecting an actual current value of the inductive load;
a feedback setting section for setting the duty ratio for feedback based on a deviation between a target current value of the inductive load and the actual current value detected by the actual current value detection section so that the actual current value follows the target current value;
a drive frequency setting section for setting the drive frequency of the pulse signals;
a detection setting section for setting the duty ratio for detection, the duty ratio for detection being provided for detecting a natural vibration frequency of the inductive load;
a natural vibration frequency setting section for setting the natural vibration frequency of the inductive load based on the actual current value that is detected when the duty ratio for detection is set; and
a selection section
for, at a normal time when a predetermined condition for detecting the natural vibration frequency is not satisfied, selecting the feedback setting section as a duty ratio setting section, which sets the duty ratio in the pulse signal generating section, and
for, when the predetermined condition for detecting the natural vibration frequency is satisfied, selecting the detection setting section as the duty ratio setting section, which sets the duty ratio in the pulse signal generating section,
wherein:
the detection setting section sets the duty ratio for detection, which is different in duty ration value from the duty ratio for feedback used by the pulse signal generating section before the duty ratio setting section switches over from the feedback setting section to the detection setting section; and
based on the natural vibration frequency detected, the drive frequency setting section sets the drive frequency so as not to generate resonance.

2. The load drive control device according to claim 1, wherein:
the natural vibration frequency setting section differentiates the detected actual current value to acquire a peak time point of the detected actual current value; and
the natural vibration frequency setting section calculates the natural vibration frequency from a plurality of the peak time points.

3. The load drive control device according to claim 1, wherein:
under a situation where the target current value is constant, when a predetermined time has elapsed since the target current value became constant, the selection section selects the detection setting section for a predetermined time period.

4. The load drive control device according to claim 3, wherein
when the target current value changes after the selection section switches the duty ratio setting section to the detection setting section, the selection section switches the duty ratio setting section to the feedback setting section even before the predetermined time period has elapsed.

5. The load drive control device according to claim 1, wherein
the inductive load is a solenoid of a hydraulic valve.

* * * * *